(12) United States Patent
Ernstberger et al.

(10) Patent No.: US 6,746,520 B2
(45) Date of Patent: Jun. 8, 2004

(54) AIR DEHUMIDIFIER FOR PNEUMATIC BRAKE FORCE PRODUCING DEVICE

(75) Inventors: Heinrich Ernstberger, Munich (DE); Albert Kerscher, Eching (DE); Christian Schubert, Munich (DE); Peter Limmer, Biehl (DE)

(73) Assignee: Knorr-Bremse Systeme für Schienenfahzeuge GmbH, Munich (DE)

( * ) Notice: Subject to any disclaimer, the term of this patent is extended or adjusted under 35 U.S.C. 154(b) by 0 days.

(21) Appl. No.: 10/257,684

(22) PCT Filed: Dec. 18, 2001

(86) PCT No.: PCT/EP01/14969
§ 371 (c)(1),
(2), (4) Date: Oct. 15, 2002

(87) PCT Pub. No.: WO02/49898
PCT Pub. Date: Jun. 27, 2002

(65) Prior Publication Data
US 2003/0141758 A1 Jul. 31, 2003

(30) Foreign Application Priority Data
Dec. 19, 2000 (DE) .......... 100 63 227

(51) Int. Cl.$^7$ ............ B01D 5/00
(52) U.S. Cl. ............ 96/188; 95/288
(58) Field of Search .......... 96/188, 189, 190; 95/288; 303/86; 188/352

(56) References Cited

U.S. PATENT DOCUMENTS

| | | | | |
|---|---|---|---|---|
| 4,707,166 A | * | 11/1987 | Khosropour | 96/400 |
| 4,838,343 A | * | 6/1989 | Bogue | 165/47 |
| 5,190,569 A | * | 3/1993 | McGrath | 96/135 |

FOREIGN PATENT DOCUMENTS

GB 352972 * 7/1937

* cited by examiner

Primary Examiner—Robert A. Hopkins
(74) Attorney, Agent, or Firm—Barnes & Thornburg LLP

(57) ABSTRACT

A pneumatic brake force producing device for a vehicle comprising: a heat storing container; at least one intake device in the container for taking in surrounding air, the intake device having a condenser for condensing humidity out of the surrounding air, the condenser including at least one pope feeding the intake air the brake force producing device, and at least portions of the at least one pipe ore arranged in a cooler zone of the container which is cooler in a regular driving operation of the vehicle than air-guiding parts of the brake force producing device.

11 Claims, 1 Drawing Sheet

AIR DEHUMIDIFIER FOR PNEUMATIC BRAKE FORCE PRODUCING DEVICE

The invention relates to a pneumatic brake force producing device having at least one intake device for the surrounding air.

During the operation of the service brake, an air exchange takes place in the case of a pneumatic brake force producing device between the pressureless spaces of the pneumatic brake force producing device and the environment.

Systems are known which take in air directly from the environment, in which case special take-in elements hinder the taking-in of dust and/or splashing water.

When the surrounding conditions change, for example, the temperature of the surrounding air, the components of the brake force producing device adapt to the new surrounding conditions slowly.

If the taken-in air is, for example, warmer than the pneumatic brake force producing device, which happens, for example, when leaving a tunnel, there is the risk of a condensation of the air humidity in the pneumatic brake force producing device. This may lead to a corrosion within the pneumatic brake force producing device. This corrosion may result in operating disturbances or failure of the brake forcing producing device.

The present invention providing a device which reduces the danger of a condensation of the air humidity in the brake force producing device. The device is to be cost-effective and should require no maintenance.

The present invention is a pneumatic brake force production device for a vehicle having at least one intake device for taking in surrounding air. The at least one intake device has a heat storing container and condenser for condensing humidity out of the surrounding air. The condenser includes at least one pipe feeding or guiding the surrounding or intaken medium or air to the brake force producing device. In addition, at least portions or parts of the at least one pipe are arranged in a cooler zone or area of the container which, in a regular driving operation of the vehicle, is cooler than air-guiding parts of the brake force producing device.

The taken-in air is fed or sucked through the condenser into the pneumatic brake force producing device. In the parts of the at least one pipe (which pipe may hereinafter be called "the pipe", "the piping", "the coiled piping" and/or "the condenser") of the condenser which are situated in the cooler zone, the air guided in the pipe will be cooled. Since, at the same absolute humidity of the air, the relative air humidity of cold air is higher than that of warm air, condensation of the air will occur in the cooler zone inside the pipe. During the air flow through the pipe, the temperature of the air approaches the temperature of the interior surface or wall of the pipe. Since the air-guiding parts of the brake force producing device, in the regular-driving operation, are warmer than the pipe, the temperature of the air remains the same when entering the brake force producing device or it heats up. In this case, the relative air humidity remains the same when leaving the intake device or it falls as the temperature increases. Since the relative humidity is below the saturation point of the air leading to a condensation at this temperature, the risk of a condensation of the air within the pneumatic brake force producing device is considerably reduced. As a result of this simple construction, the brake force producing device of the present invention is cost-effective. Since it contains no movable parts or parts subject to wear, it is maintenance-free.

In the present invention, the pipe may be a pipe or a pipe system. The cross-section may be, for example, round, elliptical, rectangular polygonal, etc. The pipe may, for example, also comprise a duct or a hose or may be a combination of various elements.

The entire pipe may be arranged in the cooler zone or may, for example, be cooled separately or independently from just being in the cooler zone.

The condenser may be, for example, a pipe whose free end represents a condenser intake opening. The free end may terminate or end in the proximity of or form a heat-storing body which may be all or a portion of the container. For example, the heat-storing portion may be in the proximity of the bottom of the container which is open toward its top. Inside the container, the temperature profile of the air changes or adapts itself to the surrounding temperature from the top to a bottom of the container. Cool air layers situated at the bottom of the container act in a heat-absorbing fashion. The area of the highest condensation will then be the area of the free end of the pipe.

The slope or inclination of the pipe is, for example, greater than the maximal slope and/or the inclination of a line or travel path carrying the vehicle. As a result, condensate, which forms during flow through the pipe, can flow off through the pipe independently of the vehicle inclination. The risk of a condensate intake is thereby reduced.

A heat exchange surface or exterior pipe surface of the condenser toward an exterior or cooling medium is, for example, larger than an interior surface of the condenser toward the guided taken-in air or interior medium. Thus, on its exterior surface, the pipe can be maintained at a temperature of heat-storing body surrounding it, while the temperature of the air guided on the inside of the pipe may approach but be greater than the temperature maintained by the heat-storing body. The cooling medium may be air or another gas or a liquid.

The pipe may be made, for example, of a corrosion-resistant material.

Other aspects and novel features of the present invention will become apparent from the following detail description of the invention when considered in conjunction with the accompanying drawings.

DETAILED DESCRIPTION OF THE PREFERRED EMBODIMENTS

Figure 1:
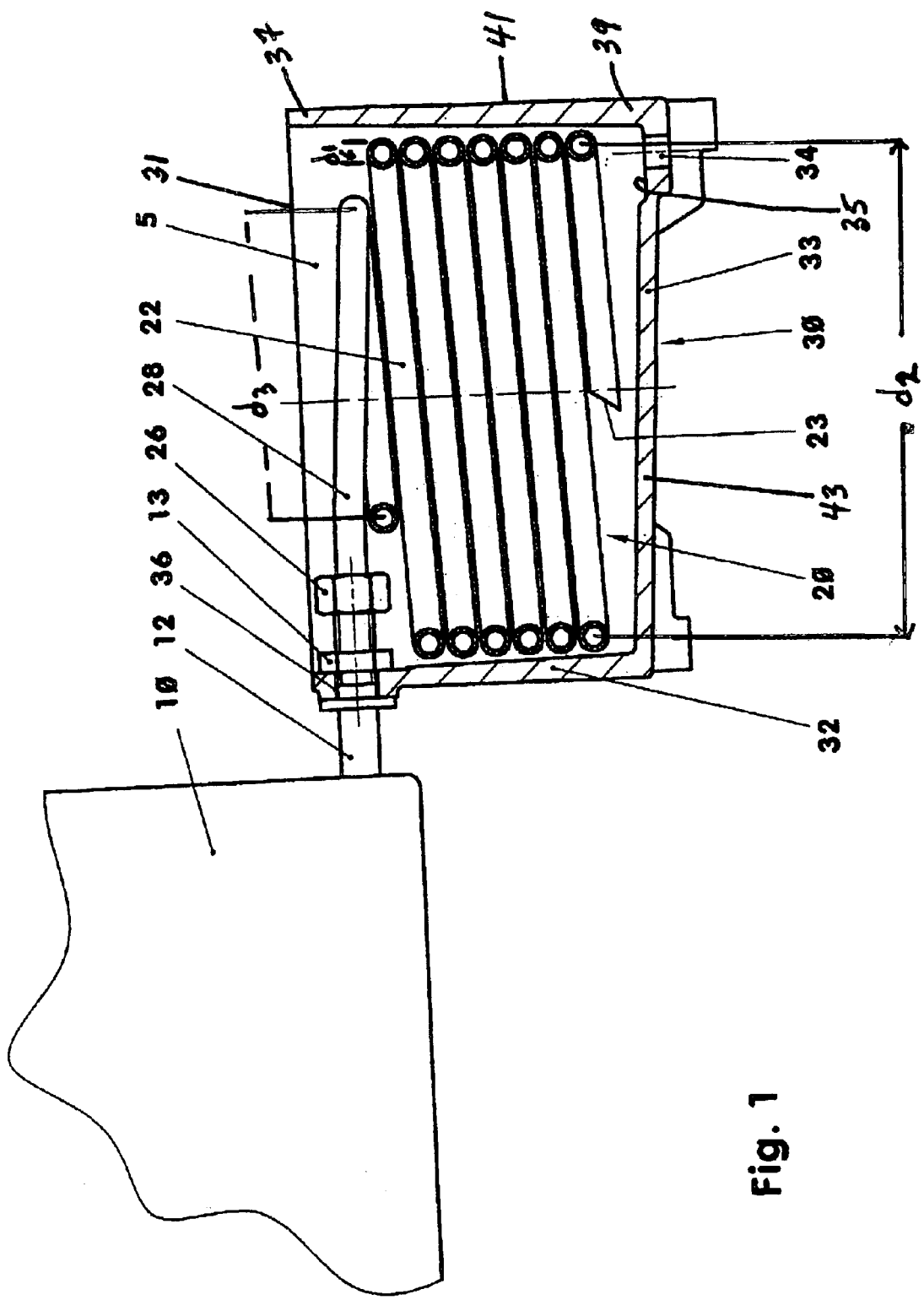
FIG. 1 is a partial side cross-sectional view of a brake force producing device, according to the present invention.

FIG. 1 shows a pneumatic brake force producing device 10 for a vehicle (not shown) having at least one intake device 20 for taking in surrounding air 5. The at least one intake device 20 includes a heat storing container 30 and a condenser or piping 22. During operation of a service brake, an air exchange takes place between pressureless spaces (not shown) of the brake force producing device 10 and surrounding air 5 in order to condense humidity out of the surrounding air 5. The intake device 20 includes at least one coiled piping or pipe 22 by which, for example, a medium such as surrounding air 5 is taken or guided into the brake force producing device 10. At least portions of the pipe 22 are arranged in a cooler zone (not shown) of the container 30 which zone is cooler during a regular driving operation of the vehicle than air guiding parts (not shown) of the brake force producing device 10.

The coiled piping 22 is disposed in the container 30 which may be open toward its top 31. The coiled piping 22 may be approximately perpendicularly arranged, helically extending pipe of a constant cross-section. At one terminus oft he piping 22, adjacent a bottom 33 of the container 30, there is a free end 23 which comprises an intake opening. Approximately eight pipe turns may be disposed above one another. The diameter $d_2$ of the coiled piping 22, in an approximately lower six pipe turns, may amount to approximately 16 times the diameter $d_1$ of the pipe 22. One or more of the pipe turns may have a constant slope of approximately 1.25 times the diameter of the pipe.

The diameter $d_3$ of the uppermost one-and-a-half pipe turns any amount at approximately 60% of the diameter of the coiled piping 22. Adjacent the top 31 of the container 30, the coiled piping 22 may change into a straight pipe piece 28 which may then be connected by a screwed pipe connection 26 with an intake connection piece 12 of the brake force producing device 10.

In proximity to the screwed pipe connection 26, the intake connection piece 12 may be fastened in a passage bore 36 of the container 30 by a screwed connection 13.

The container 30 has an approximately cylindrical side wall or jacket 32 which may taper in an upward direction form the bottom 33 to the top 31 of the container 30. An upper jacket wall thickness 37 may be approximately three fourths of a lower jacket wall thickness 39. The jacket 32 may rise from the bottom 33 of the container 30 approximately 20% higher than the coiled piping 22. The bottom 33 of the container 30 may have approximately the same thickness as the upper wall thickness 37 of the jacket 32 and may drop off toward one side of the container 30. A gradient or vertical drop off of the bottom 33, for example as viewed form left to right in FIG. 1 is approximately twice a thickness 43 of the bottom 33. In FIG. 1, the lowest portion of the bottom 33 is on or adjacent side 41 of the container 30 facing away for the brake force producing device 10.

In the bottom 33 and adjacent to side 41, a vertical passage bore 34 may be countersunk through an interior surface 35 of the container 30. The diameter of this bore 34 may correspond approximately to the diameter of the pipe of the coiled piping 22.

During a drive or movement of the vehicle, air for the brake force producing device 10 is taken in at end 23 from the surrounding or surrounding air 5 through the coiled piping 22.

During a long drive or movement of the vehicle with normal average braking operations at a uniform surrounding air temperature, the coiled piping 22 has an insignificantly lower temperature than the air-guiding parts (not shown) of the brake force producing device 10. As a result of sporadic activation of the brake force producing device 10, the temperature of the air-guiding parts of the brake force producing device 10 may generally be above the temperature of the air around the vehicle. Thus, the brake force producing device 10 may have interior and exterior areas (not shown) with approximately the same temperature. Therefore, during the intake of the surrounding air or intake medium 5, the relative air humidity may remain approximately constant because of the uniform temperature of the medium 5. The humidity of the intake air 5 therefore does not condense on walls of the coiled piping 22 or on interior walls of the air-guiding parts (not shown) of the brake force producing device 10.

During a drive or movement of the vehicle from a warmer region into a cooler one, for example, when driving into a tunnel, the temperature of the taken-in surrounding air 5 may drop faster than the temperature of the brake force producing device 10 and of the coiled piping 22. The now taken-in colder air 5 may absorb a lower amount of humidity than the air in the warmer brake force producing device 10. When entering the condenser 22 and then the brake force producing device 10, the taken in colder air 5 is warmed. In this case, its relative humidity will fall. No condensate will form in such an uncritical case.

When, in contrast, the vehicle (not shown) drives or is moved from a cooler region into a warmer one, as, for example, when exiting a tunnel, when driving downhill in a mountainous area or when driving into buildings or hangars, the surrounding air 5 may warm up more rapidly than the interior area (not shown) of the brake force producing device 10 or the coiled piping 22. The amount of humidity in the warm surrounding air 5 may now be higher than that in the colder air in the interior area of the brake force producing device 10. When flowing through the cool coiled piping 22, the taken-in air 5 is cooled. In this case, the relative air humidity may now exceed the cooled taken-in air's 5 saturation point. A portion of that air humidity condenses on interior walls of the coiled piping 22. The amount of humidity in the cooled taken-in air 5 decreases. As a result of an ascending arrangement of the coils 22 (as seen in FIG. 1), the forming condensate (not shown) flows out the free end 23 into the container 30 and then flows out through the opening 34 of the container 30. Because of its position protected from the air stream, the coolest point of the condenser 22 may be the free end 23. Here, the highest condensation generally will take place. The condensation may therefore decrease along the condenser 22 from the free end 23 to the intake connection piece 12 of the brake force producing device 10.

In order to avoid corrosion, the coiled piping 22 may be constructed of a low-corrosion steel, for example, ×55 CrNi 189.

During a flow though the piping coils (22), the temperature of the air may asymptotically approach the temperature of the piping 22. Because the exterior or outer wall heat exchange surface of the coiled piping 22 is larger than the interior wall or surface of the coiled piping 22, the outer wall surface of the coiled piping 22 may retain approximately the temperature of the heat-storing container 30 surrounding it.

The container 30 may, for example, be produced of a material suitable for casting. The heat-storing container 30 surrounds the coiled piping 22. The coldest or cooler zone or area (not identified) inside the container 30 is the area of or adjacent to The bottom 33. In this colder zone, an increase or rise in air temperature is slower than or delayed in comparison to arise in temperature of the surrounding air 5.

Although the present invention has been described an illustrated in detail, it is to be clearly understood that this is done by way of illustration and example only and is not to be taken by way of limitation. The spirit and scope of the present invention are to be limited only by the terms of the appended claims.

We claim:

1. A pneumatic brake force producing device for a vehicle having at least one intake device for taking in surrounding air, the at least one intake device comprising:
   a heat storing container;
   a condenser including at least one pipe having a free end open to taken in surrounding air for condensing humidity out of the taken in surrounding air, the condenser feeding the taken in surrounding air to the brake force producing device, and at least portions of the at least one pipe are arranged in a zone of the container which is cooler in a regular driving operation of the vehicle than air-guiding parts of the brake force producing device.

2. The pneumatic brake force producing device according to claim 1, wherein heat is withdrawn from the at least one pipe at least in an area of the free end by the heat-storing container.

3. The pneumatic brake force producing device according to claim 2, wherein an inclination of the pipe from the free end to the brake force producing device is greater than the maximal inclination of a travel path carrying the vehicle.

4. The pneumatic brake force producing device according to claim 1, wherein a heat exchange surface of the condenser toward an exterior medium is larger than an interior surface of the condenser toward the taken-in air.

5. The pneumatic brake force producing device according to claim 1, wherein the pipe is made of a corrosion-resistant material.

6. The pneumatic brake force producing device according to claim 1, wherein at least parts of the at least one pipe are arranged inside the container and the container has at least one opening in a bottom area.

7. The pneumatic brake force producing device according to claim 2, wherein when the vehicle is moved from a cooler region into a warmer one, there is a temperature gradient decreasing from a top of the container to a bottom of the container.

8. The pneumatic brake force producing device according to claim 1, wherein the entire at least one pipe is in the cooler zone.

9. The pneumatic brake force producing device according to claim 1, wherein the entire at least one pipe is cooled separately from being in the cooler zone.

10. The pneumatic brake force producing device according to claim 1, wherein the at least one pipe has one or more pipe turns and a diameter $d_3$ of an uppermost arrangement of pipe turns is smaller than a diameter $d_2$ of a lower arrangement of pipe turns.

11. A pneumatic brake force producing device for a vehicle having at least one intake device for taking in surrounding air, the at least one intake device comprising:
  a heat storing container that, being open to the surrounding air, continuously absorbs and stores the temperature of the surrounding air during a regular driving operation of the vehicle; and
  a condenser for condensing humidity out of taken-in surrounding air, the condenser including at least one pipe feeding the taken-in surrounding air to the brake force producing device, and at least portions of the at least one pipe are arranged in a zone of the container that is cooler in a regular driving operation of the vehicle than air-guiding parts of the brake force producing device.

* * * * *